United States Patent [19]

Bush

[11] Patent Number: 5,035,848
[45] Date of Patent: Jul. 30, 1991

[54] FILAMENT SEPARATION IN LIQUIDS

[75] Inventor: Stephen F. Bush, Poynton, United Kingdom

[73] Assignee: Prosyma Research Limited, Poynton, United Kingdom

[21] Appl. No.: 424,286

[22] PCT Filed: Apr. 21, 1988

[86] PCT No.: PCT/GB88/00304

§ 371 Date: Dec. 18, 1989

§ 102(e) Date: Dec. 18, 1989

[87] PCT Pub. No.: WO88/08365

PCT Pub. Date: Nov. 3, 1988

[30] Foreign Application Priority Data

Apr. 21, 1987 [GB] United Kingdom ............... 8709445

[51] Int. Cl.$^5$ ............................................. B29B 15/08
[52] U.S. Cl. .................................... 264/174; 264/171;
264/211.22; 264/211.23; 264/108
[58] Field of Search ............. 264/171, 211.21, 211.22,
264/211.23, 328.18, 108, 174; 425/197, 198

[56] References Cited

U.S. PATENT DOCUMENTS

| 2,210,004 | 8/1940 | Rautenstrauch | 288/8 |
| 3,009,685 | 11/1961 | Rettig | 425/198 |
| 3,609,806 | 10/1971 | Schippers et al. | 18/12 B |
| 3,713,762 | 1/1973 | Oisugu | 425/197 |
| 3,954,365 | 5/1976 | Barth et al. | 264/211.21 |
| 4,304,745 | 12/1981 | Alderson et al. | 425/197 |
| 4,478,516 | 10/1984 | Kessler | 366/87 |
| 4,883,622 | 11/1989 | Dealy et al. | 264/108 |

FOREIGN PATENT DOCUMENTS

| 0113041 | 7/1984 | European Pat. Off. . | |
| 0877949 | 4/1953 | Fed. Rep. of Germany . | |
| 1494670 | 9/1967 | France . | |
| 2519180 | 7/1983 | France . | |
| 0153197 | 12/1981 | German Democratic Rep. | 425/197 |
| 452477 | 2/1965 | Japan | 425/197 |
| 54-108864 | 8/1979 | Japan . | |
| 57-89935 | 9/1982 | Japan . | |
| 0947386 | 1/1964 | United Kingdom | 425/197 |
| 1400542 | 7/1975 | United Kingdom . | |
| 1480219 | 7/1977 | United Kingdom . | |
| 2039225 | 8/1980 | United Kingdom . | |
| 2055680 | 3/1981 | United Kingdom . | |
| 8607285 | 12/1986 | World Int. Prop. O. . | |

Primary Examiner—Hubert C. Lorin
Attorney, Agent, or Firm—Spensley Horn Jubas & Lubitz

[57] ABSTRACT

A method of separating filaments from a clump thereof in a liquid flow from each other by sub-dividing the flow across its lateral extent to pass through an array of a plurality of filament separating channels having a cross-section at least large enough to accommodate the cross-section of the clumps such that flow along the channels imparts a shearing force to filaments at the edge of the flow in the channel to separate these axially from each other and from filaments at the center of the clump.

23 Claims, 3 Drawing Sheets

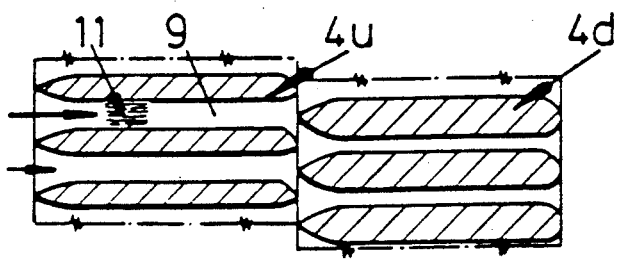
FIG. 8a
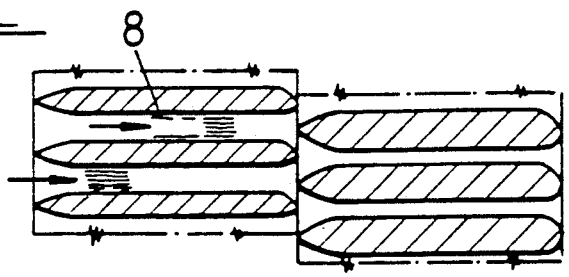
FIG. 8b
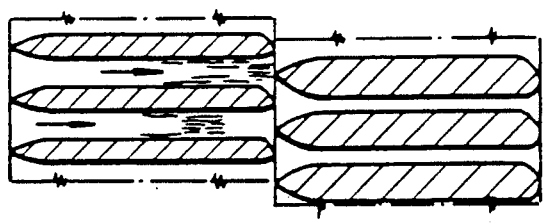
FIG. 8c
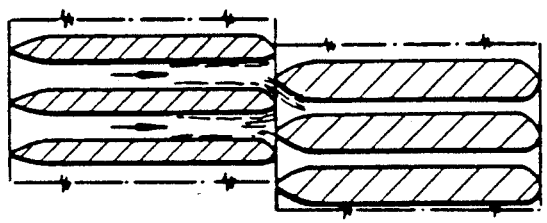
FIG. 8d
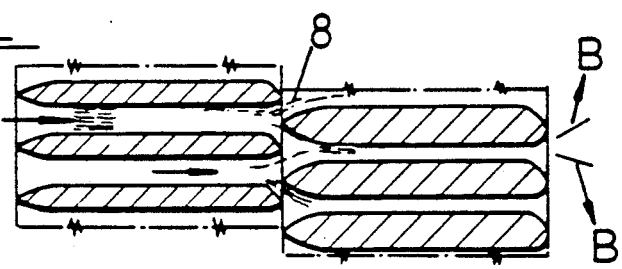
FIG. 8e
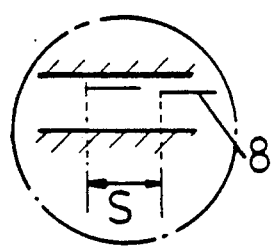

FILAMENT SEPARATION IN LIQUIDS

The present invention relates to a method for the processing of liquids containing aggregates of discrete filaments for the purpose of ensuring separation of the filaments from each other. The invention relates more particularly, although not exclusively, to the separation of such filaments in liquid (e.g. molten) polymer or resin flows prior to further processing of such flows to produce a coherent or semi-coherent structure of the filaments within the polymer or resin which is subsequently formed into solid artefacts.

It has long been recognised that the addition of glass, or other strong fibres, to a thermoplastic or thermoset polymer in a suitable fashion, usually brings increased stiffness or strength, or both, to the material processed into its final form. In the case of thermoplastics the glass fibres have until recently been quite short, often in the range 0.3 to 1 mm, and compositions have been processed in the same ways, for example by extrusion or injection moulding, as apply to thermoplastics on their own. The result of such processing is that by and large the fibres are disposed in the resulting solid artefact in ways which reflect the adventitious actions of the flow of the thermoplastic during the shaping process. It follows that the fibres will not in general be disposed so as to maximise their beneficial effect.

In the case of thermoset compositions, reinforcing fibres may be short, of the order 0.3 to 1 mm as in reaction injection moulding, with the same disadvantage described for thermoplastic materials, or they may be long discrete fibre rovings (typically 25 mm or longer) or as in filament winding, continuous through a considerable portion of the structure. If long discrete fibres are used, they are usually either constructed into a loose woven mat prior to contacting the resin, or scattered in a random, overlapping fashion on to a layer of resin with further resin placed on top.

In all cases with thermosets a degree of beneficial organisation of the fibres is obtained separately from the processes of resin flow and shaping to final artefact form.

This organisation into a more-or-less organised structure is a major reason why fibre-resin reinforced thermoset compositions show much greater strength and stiffness than do compositions based on short fibres which cannot be formed into such structures at the fibre loadings generally used. As will readily be appreciated, however, the advantage of the long-fibre method referred to carries with it a processing disadvantage by comparison with its short-fibre competitor, in that generally a good deal of semi-manual or mechanical intervention is required to achieve the desired organisation or disposition of the fibres.

Recently it has become clear that it is possible to create three dimensional network structures within a liquid by perturbing in a controlled, sequential manner, the liquid flow relative to its predominant direction provided the product of volume concentration and aspect ratio (l/d) of the fibre elements present in the flow exceeds a minimum value. In practice the criterion is met by fibre elements in the form of monofilaments of 5 to 15 mm long at volume concentrations of a few percent upwards. Such a process is disclosed in PCT/GB 87/00883 filed Dec. 7, 1987. In particular it is possible to obtain such network structures with thermoplastic and thermoset resins and to substantially preserve their structures during shaping of the thermoplastic or thermosets into their final solid state forms.

The fibres may be provided by polymer granules with a high loading (e.g. 20-50% by volume of the granules) of glass, carbon or metal fibres which have become available for use in extrusion or moulding. The fibres in the granules are typically in the form of a tow or roving of discrete filaments having a typical length of 5 to 15 mm and diameter of 2-20 microns Each granule may contain several (e.g. 2 to 4) lengths of the tow or roving each of which may contain 1000 to 5000 of the filaments. Such granules the 'fibre granules') may be admixed with other granules (the 'polymer granules') of the same polymer, (but not containing any fibres) in such a proportion that a desired volume concentration of filaments (e.g. 1-7%) is obtained in the overall mixture. The mixture of granules is then fed to an extruder or injection moulding machine where it is melted and caused to flow through a shaping die (if extruded) or into a mould (if injection moulded).

The creation of a coherent or semi-coherent network structure by the technique described in the last but one paragraph requires that the individual filaments or bundles of filaments come into near contact (defined as approach to within one filament diameter) with a certain minimum number of other filaments or bundles lying at significant angles to each other (typically between 30° and 90°). This in turn depends on the aspect ratio (l/d) of the filament or filament bundles. Since the maximum aspect ratio of a bundle is realised by "bundles" of one filament only it is necessary in order that the filaments may be used optimally in a reinforcing structure that the individual filaments be adequately separated out from each other. When the dry granule mix is subject to the process of melting and flow obtained in the polymer processing apparatus it is frequently found that while the fibre containing granules have evidently been adequately dispersed among the polymer granules, many individual filaments are still bound together in their original bundles or clumps as they pass through the extrusion die or into the mould. Such clumps may comprise 50 or more of the filaments but only behave effectively as a single filament in creating the desired network structures.

For some fibre/polymer matrix combinations it is possible to treat the fibres chemically in such a way that, when the granules are melted, the individual filaments separate away from each other. However each fibre matrix combination requires a specific treatment for this effect to be obtained and some desirable conbinations are difficult if not practically impossible to achieve with existing technology.

Standard mixing methods for polymer melts also can achieve disruption of the clumps and separation of filaments by imposing varying stresses in a sequence of rapidly changing directions. However this action tends to lead to high levels of breakage of the filaments thereby reducing the aspect ratio (l/d) available for their efficient use in creating a network structure. For this reason it is desirable, where polymer has to pass between relatively moving surfaces, to keep the filaments in clumps until just prior to any shaping stage to protect them from adventitous breakage.

It is therefore an object of the present invention to provide a method and apparatus for separating discrete filaments in a liquid flow.

According to the present invention there is provided a method of separating filaments from clumps thereof in a liquid flow, the filaments being present in substantially parallel relationship within the individual clumps, the method comprising sub-dividing the flow across its lateral extent to pass through an array of filament separating channels provided downstream of any moving processing components, said filament separating channels having a cross-section which is sufficiently large to accommodate the cross-section of a clump but which constrains the clump to move in its axial direction along the channel so that an unaxial shearing force is applied to filaments at the edge of the flow in the channel to separate these filaments axially from each other and from filaments in the centre of the clump without substantial breakage of the separated filaments.

Preferably the flow from the aforementioned array is passed through at least one successive array of filament separating channels disposed such that portions of the remains of the clumps from the first array enter the successive channels at the edges thereof so that further separation is effected by shearing along the filament axis.

The invention is applicable particularly to the processing of resin or molten plastic (particularly thermoplastic) flows in extrusion or moulding operations.

In accordance with the method of the invention, therefore, the filament clumps in the liquid flow pass along filament separating channels with cross-sectional dimensions such that a portion of the clump is in the flow at the edge of the channel whereas a portion is located more centrally in the channel. Filaments at the edge of the clumps are subject to a controlled shearing force in the direction of their axes resulting from the naturally greater flow at the centre of the channel than at the edges. As a result the outer filaments of the clump become separated without breaking. Subsequently, the remains of the clump leave the channel and may enter successive (usually smaller) channels in which a portion of the clump is in the edge flow so that further axial separation of filaments takes place.

The filament separation takes place downstream of any moving polymer processing components so that the protective effect of the clumps is maintained. Filament separation may however be effected immediately upstream of any device for forming a network structure from the filaments, and certainly upstream of any forming die or mould.

It is important that the lateral spacing of the individual channels is small in comparison with the overall dimensions of the passageway along which the liquid is flowing. This scale relationship ensures that no appreciable part of the liquid has at any cross-section of the passage a flow history which is significantly different from any other.

The liquid may have been produced by melting filament-containing polymer granules (of the type discussed above). To ensure the optimum separating power of the assembly, the minimum channel cross-sectional areas in the first array should not greatly exceed the cross-sectional area of the original filament clumps present in the granule. In practice a said minimum cross-sectional area of 1.5 to 3 times the cross-sectional area of the clumps orignally present in the granule may be found to provide an optimum balance between pressure expended and separation achieved in one array.

The minimum cross-sectional area of the channels in any second or subsequent array may be less than those in the immediately preceeding array to take account of the reducing size of the remains of the fibre clumps but the numbers of such channels may be increased at least in proportion to the said reduction in cross-section.

In some cases it may be desirable to ensure that on leaving a filament separation channel the liquid is capable of lateral expansion before entering the next channel. Such expansion provides a more even distribution of the filaments within the liquid.

The individual channel arrays may be provided from blocks axially spaced along the flow passageway.

The invention will be further described by way of example only with reference to the accompanying drawings, in which FIG. 1 shows a conventional left-hand coordinate axis system to which reference is made in the description and subsequent Figures;

FIGS. 8a-e illustrate the manner in which filaments are separated from each other.

Figure 9:
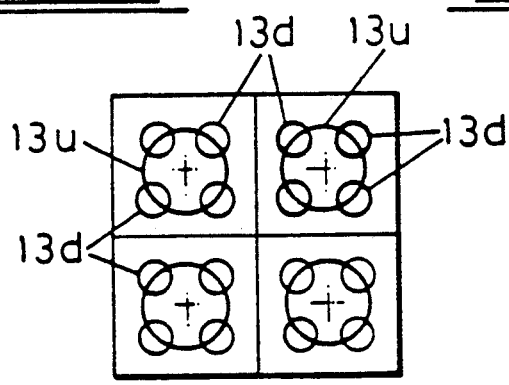

FIG. 9 illustrates staggered filament separating channels in successive arrays.

Figure 10:
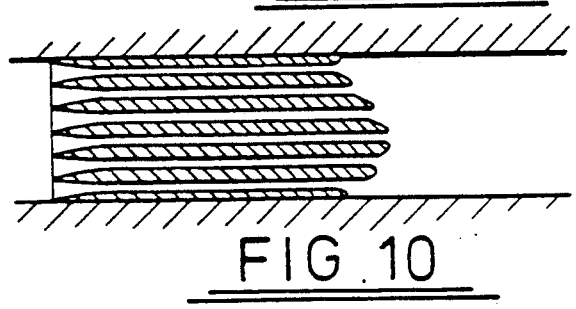

FIG. 10 illustrates modified filament separating channels

Figure 1:
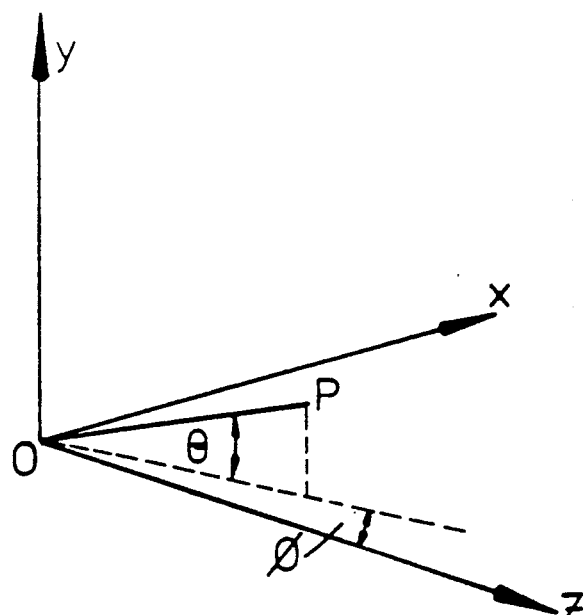

FIG. 1 defines a conventional left-hand co-ordinate axis system for a flow passage in which the filament separating device is located. $O_z$ corresponds to the principal flow direction of the liquid. Where the passage is essentially an annulus, Ox lies in the direction of the annulus perimeter and Oy in the thickness direction. Where the passage is a slot then Ox lies in the direction of the slot width and Oy is in the thickness.

Figure 2:
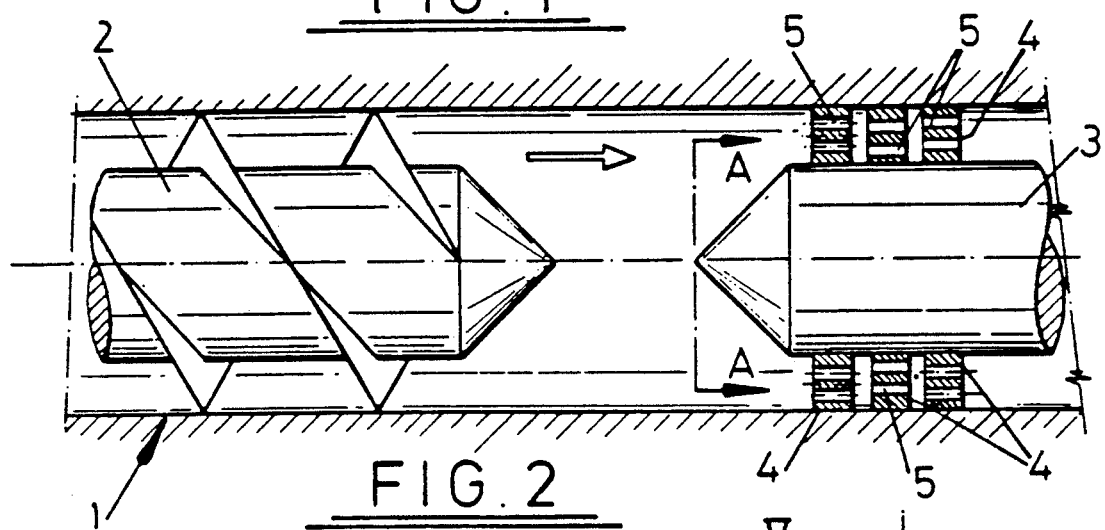
FIG. 2 illustrates one embodiment of extrusion apparatus in accordance with the invention.

FIG. 2 shows extrusion apparatus 1 for pipe provided with a conventional feeder screw 2. Provided around the upstream end of core 3 are a plurality of annular blocks 4 (three illustrated) each having a plurality of apertures 5 in the Oxy plane. Although not illustrated in the drawing, an arrangement such as that shown in FIG. 12 of PCT/GB 87/00883 may be provided downstream of blocks 4 for forming discrete filaments into coherent or semi-coherent network structure prior to the polymer being passed into an extrusion die (again not shown) for final shaping.

Figure 3:
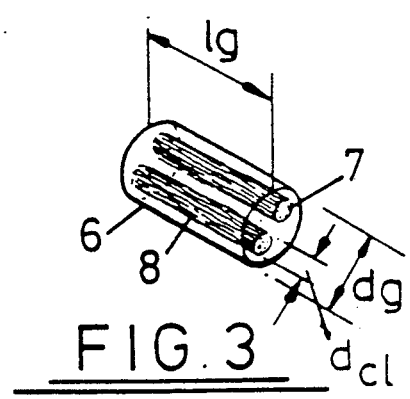
FIG. 3 illustrates a filament-containing polymer granule intended to be processed by the apparatus of FIG. 2.
Figure 4:
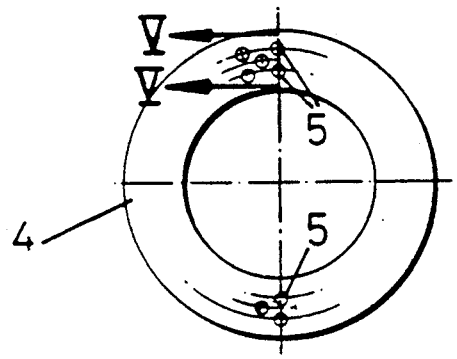
FIG. 4 is a plan view looking in the direction of arrow A of one of the fibre separating arrays shown in the apparatus of FIG. 2.

The feed material for the extrusion apparatus will comprise polymer granules 6 such as shown in FIG. 3. These granules are basically cylindrical pellets comprising lengths of fibre 7 (e.g. a yarn or tow) within a polymer (e.g. a thermoplastic) matrix. The granule is shown as having a length $l_g$ which will typically be 5 to 15 mm. Each fibre length 7 is comprised of discrete filaments 8 with a length of about $l_g$ so that the filaments are continuous throughout the granule and typically there will be 2 to 4 lengths of the yarn or tow 7 in the granule each comprised of 1000–5000 filaments 8. The thickness of the granule is designated as dg and the maximum cross-sectional dimension of the yarn or tow is designated $d_{cl}$.

The extrusion apparatus 1 may be fed with a mixture of the aforementioned granules together with granules without fibres, and the granule mixture will be heated, melted and advanced by the screw 2 in a well known manner.

The molten polymer approaching the upstream annular block or array 4 will, unless it has been specially chemically treated as mentioned above, contain clumps of filaments which have not been separated from each other. Arrays 4 provide for the separation of the filaments from the clumps. More particularly, it is the passage of the fibre clumps through the apertures 5 (which provide flow channels 9 through the blocks—see FIG. 3) which effects separation of the filaments (as described more fully below).

Figure 5:
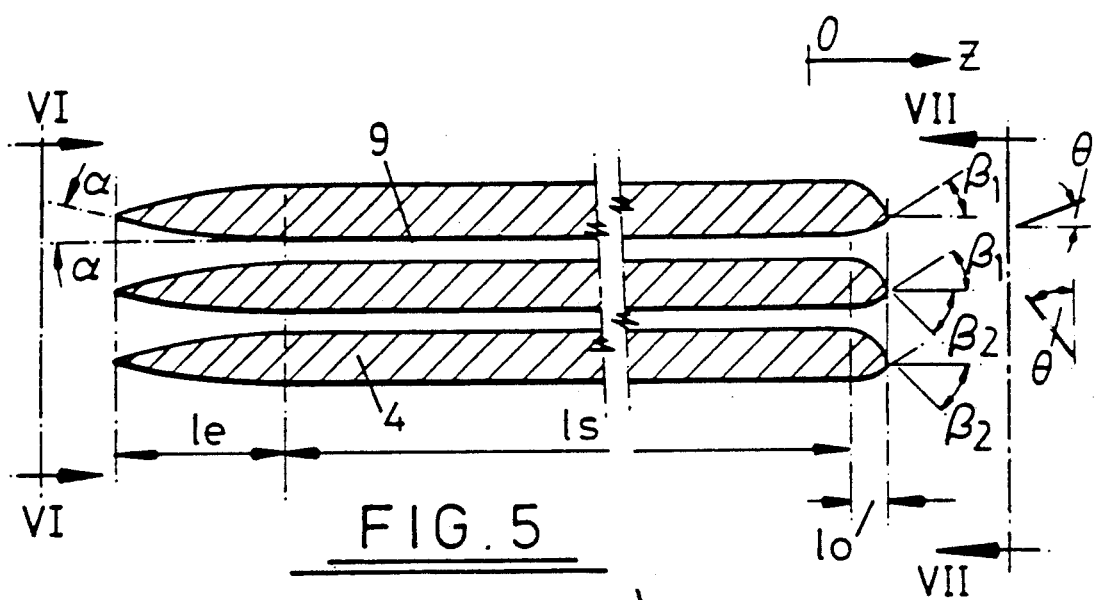
FIG. 5 is a cross-section on the line V—V of FIG. 4.

Referring to FIG. 5 each channel 9 in the block 4 has a tapering lead-in (or entrance) section of length $l_e$, a separating section of length $l_s$ which may be of substantially constant cross-section, and an outlet section of length $l_o$.

Figure 6:
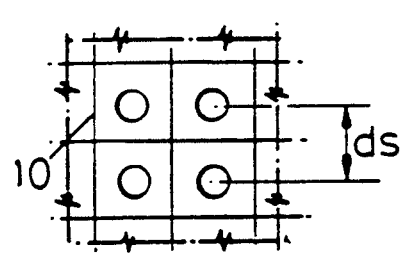
FIG. 6 is a view on the line VI—VI of FIG. 5.

The centres of the entrances to the channels are preferably spaced by a distance $d_s$ (FIG. 6) not less than the length $l_g$ of the fibre granules but not so great as to cause any appreciable part of the liquid at any cross-section of the passage to have a flow history which is significantly different from any other. The entrance cross-section (FIG. 6) to each channel 9 will desirably have distinct edges 10 facing upstream, typically a rectangular (FIG. 6) or hexagonal array. The entrance length $l_e$ reflects the elastic properties of a polymer melt in that any propensity to create a vortex in the entrance zone is minimised by a taper angle ($\alpha$) generally in the range 10°–15°. Greater angles may be used where the elastic behaviour is less pronounced. These three provisions will ensure that material (particularly fibre clumps) is not held up at the entrance to the arrays 4. Such a hold-up would give rise to material degradation and eventual blockage of the channels.

The separating section $l_s$ may be of uniform cross-section which preferably has a cross-sectional area greater than the cross-sectional area of a fibre 7 in the granule 6 but not greater than 1.5 to 3 times the cross-sectional area of a fibre 7. Departures from this range are possible but result in a reduction in separation power or high back pressure. The length $l_s$ is for preference at least twice the granule length $l_g$ and typically is five to twenty granule lengths.

The outlet section $l_o$ is designed to fulfill two functions in the case of the last array: (a) to rejoin or heal polymer flows, and (b) to ensure that a sufficient proportion of filaments (separated by the channels 9 as described more fully below) are orientated at angles $\theta$, $\phi$ which may be needed by a subsequent device to organise a coherent fibre structure. Generally these functions are more important at the outlet of the last array 4 than for any other. For intermediate arrays the function of the outlet section is to ensure a smooth transition into the next array.

If shear stress, which extends polymer molecules, is substantially removed, polymer flows expand sideways on leaving a channel and the polymer molecules relax and can then interdiffuse. The outlet $l_o$ is thus shaped (with angles $\beta_1$ and $\beta_2$ as shown) to permit a rapid reduction of shear stress without creating dead zones between the outlet channel flows. By the same shaping, filaments will acquire angles $\theta$, $\phi$ the magnitudes of which are influenced by the angles and $\beta_1$ and $\beta_2$ which may be in the range 45° to 75°. These fibres will rotate across the join of the emergent flows thus supplementing the healing effect of the sideways expansion (as described in GB/87/00883).

The centre lines of the apertures in adjacent arrays 4 are displaced from each other. Typically, the channels 9 may have a diameter of 3 mm and the value of $d_s$ (the distance between the centre lines of the channels 9) is 5 mm, but in accordance with the principles described will depend on size of granules and tows employed.

The manner in which the apparatus serves to separate individual filaments 8 will now be described with reference to FIGS. 8 a–e. In each of these Figures the reference numeral 4u represents the first upstream array 4 and the numeral 4d represents the adjacent downstream array. The channels 9 in array 4d are of smaller cross-section than those in 4u reflecting the reduced size of the remaining clump, in accordance with Formula (I) below.

To effect the extrusion operation, the granules may be admixed with granules of the same polymer (but not containing fibres). The granule mixture is melted and advanced by screw 2 in conventional manner. Generally, the amount of fibre containing granules will be comparatively low compared to those containing only polymer. The molten polymer between the end of screw 2 and the upstream array 4u will comprise clumps 11 of filament (corresponding generally to the length of yarn or tow $l_g$ in the granules) in the molten polymer. Between the aggregate or clumps, the molten polymer will be comparatively lean in fibres.

A clump of fibres (of length $l_g$) may easily enter a channel 9 in the upstream plate 4 in view of of the dimensioning of the 'mouth' of the channel. Within section $l_e$ the clump aligns along the Oz direction with the outer regions of the aggregate being in the flow at the outer edges of the channel and inner regions of the aggregate being at the centre of flow (FIG. 8a).

Due to the naturally higher flow along the centre of the channel than at the outer edges the filaments at the outer edges of the clump are subject to a shearing motion such that, intermediate the ends of the channel 9, they begin to be 'pulled out' axially of the clump (see FIG. 8b). As the clump continues to move along the channel the separation continues such that there are discrete filaments at the edge of the channel with a remaining, now smaller, clump at the channel centre (FIG. 8c).

Figure 7:
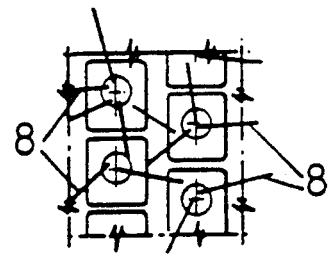
FIG. 7 is a view on the line VII—VII of FIG. 5.

The next stage in the separation is for the polymer (with filaments and clumps) to enter the channels of array 4d. As described, these channels are laterally displaced from those in array 4u. Thus, portions of the clumps which have passed out of the channels in array 4u now move sideways and pass to the edge regions of the channels in array 4d. Separation of these aggregates in array 4d proceeds in exactly the same way as in plate 4u and will thus not be described further. On leaving the last array 4d the polymer flow undergoes a transverse expansion which has the effect of laterally moving the filaments 8 (see arrows B and FIG. 7) so as to effect a more thorough distribution of the filaments within the polymer.

Obviously the total number of arrays 4 provided for any one application is sufficient to ensure complete separation of the filaments.

The channels 9 thus work by imposing a regulated sequence of shearing motion and sideways motion on the filament clumps so that filaments are successively pulled away from each other in the flow direction. The sideways motion from the last array is one which is designed (a) to give uniformity of fibre distribution in the passage, (b) to obtain definate rotations ($\theta$,$\phi$) of the filaments to the main flow direction in preparation for subsequent organisation into network structures and (c)

to heal the weld lines resulting from the division of the flow by the channel arrays.

Given the axial separation S required for two filaments of given initial lateral separation in the edge of the same clump initially, the length $l_s$ of channel required is given approximately by the equation (I)

$$\frac{l_s}{d_{cl}} = k.s. \frac{A_f}{A_{cl}} \quad (I)$$

where $A_f$ is the free area of the channel (i.e. the area not occupied by the clump) given by the expression (II)

$$A_f = A_c - A_{cl} \quad (II)$$

in which $A_c$ is the cross sectional area of the channel and $A_{cl}$ is the cross-sectional area of the clump, and $d_{cl}$ is the largest cross sectional dimension of the clump (FIG. 3).

The constant of proportionality, k, is approximately inversely proportional to the initial lateral separation of the two filaments.

It is important to realise that sufficient separation of the filaments is achieved optimally not by extending the length $l_s$ (which would merely create a high back pressure without extra separation) but by causing the filaments and clumps to enter the successive 'staggered' channels 9. Such a sequence has the effect of moving the clumps which are near the centre line of the channel 9 in the upstream array 4u to the edge of a channel 9 in the next downstream array 4d (where separating effect is high). By such means the expenditure of pressure energy in driving the clumps through the channels is minimised.

As mentioned, the channels 9 in array 4d are of reduced cross-section as compared to those in 4u. Ideally, the cross-section of the channels in 4d is in conformity with equation (I) with $d_{cl}$ and $A_{cl}$ being dependent on the dimensions of the clump from array 4u. To obviate the increased pressure drop which would otherwise occur the number of channels in array 4d (in comparison to the number in array 4u) will be desirable increased at least in proportion to the reduction in cross-sectional area.

FIG. 9 illustrates a further arrangement for the relative sizes and dispositions of filament separating channels 13u and the filament separating channels 13d in a downstream array. It will be seen that each channel 13u is associated with four of the downstream channels 13d. Clumps exiting from a channel 13u will pass into one of the associated downstream channels 13d. Once a clump has entered one of the four downstream channels 13d, a transient increase in back pressure will arise in that channel 13d so that further clumps from the associated channel 13u will preferentially pass into one of the other associated channels 13d. Thus, on average, each of the channels 13d receives only a quarter of the clumps exiting from the associated channel 13u.

In a further modification to the illustrated embodiment, the arrays 4 may be spaced from each other to allow increased lateral expansion of the polymer between the arrays.

It will have been noted that the arrays 4 may be provided around the core 2 in the form of blocks and may thus serve to support the core in the passageway, thus avoiding the need for conventional supporting 'spiders'. Additionally said blocks may obviate the need for a conventional breaker plate upstream of the core.

A further embodiment of the invention (not illustrated) has at least one array of filament separating channels arranged such that material entering the channels at a particular point in the cross-section of the flow passageway will emerge at a laterally separated point of the flow passageway cross-section thus providing transverse mixing.

The apparatus has been illustrated for the extrusion of circular pipe but there is no limitation as to the shape of extruded sections to which it may be applied, including sheet and open ducting and irregular sections. In all cases, the same considerations for the dimensioning and positioning of the flow channels in the Ox and Oy directions apply as described above.

As an alternative to admixing the granules 6 with granules, which do not contain filaments prior to melting and conveyance by screw 2, it is possible only to add and melt the granules 6 in the space between the downstream end of screw 2 and the upstream end of core 3. The arrays 4 will still effect filament separation and any possibility of filament damage by screw 2 is avoided.

In a further alternative, the polymer matrix of granules 6 may be of slightly higher melting point than the polymer in the granules without granules. The two granule types are admixed together and then heated at a temperature between the melting points of the two polymers so that the filaments in granules 6 remain coated in a "skin" of polymer as they are conveyed by screw 2 thereby minimising damage to the filaments.

Although the invention has been described with specific reference to extrusion, it may also be applied to injection moulding (particularly large mouldings) in which case the filament separating arrays are located in the mould runners.

Finally the invention may be applied so that in addition to separation of filaments it at the same time corrects the effects of non-uniform fluid memory arising upstream, for instance from passage round a bend as in a cross-head die or mould runner. FIG. 10 illustrates the use of the device with different length channels to correct an upstream flow which has produced tensile stretch at the edge of the passage and low tensile stretch at the edge of the passage. The inner channel of the array thus impose a compensating, higher tensile memory on the centre flow than on the edges.

I claim:

1. A method of separating filaments from at least one clump thereof which is provided in a liquid flow having a lateral extend, the filaments being present in substantially parallel relationship within the at least one clump, the method comprising the steps of:

pressurizing the liquid containing the at least one clump, subdividing the flow across the lateral extend and passing the flow through an array of filament separating channels having a cross-section sufficiently large so as to accommodate the cross-section of the at least one clump, the cross-section of the separating channels constraining the at least one clump to move in an axial direction along the separating channels so that a uniaxial shearing force is applied to filaments at an edge of the flow in the separating channels to separate the filaments axially from each other and from filaments in a center of the at least one clump without substantial breakage of the separated filaments.

2. A method as claimed in claim 1 wherein the flow from said array includes remains of clumps from which filaments have not been separated, the flow being passed through at least one successive array of filament separating channels disposed such that the remains of the clumps enter successive separating channels of the at least one successive array at edges of the successive channels so that further separation is effected by shearing along an axial direction of the filaments.

3. A method as claimed in claim 2 wherein the liquid expands laterally between an exit of one separating channel and an entrance of a successive downstream separating channel.

4. A method as claimed in claim 1 wherein each channel has a section of constant cross-section with a length of at least twice that of the filaments.

5. A method as claimed in claim 4 wherein said section of constant cross-section has a length in a range from 2 to 10 times that of the filaments.

6. A method as claimed in claim 1, wherein the separating channels each have a centre line, and the center lines of the separating channels are arranged parallel to each other.

7. A method as claimed in claim 6 wherein the centre-lines are spaced by a distance greater than the length of the filaments.

8. A method as claimed in claim 1 wherein the channels have a tapering inlet section.

9. A method as claimed in claim 8 wherein said tapering inlet section tapers at an angle of 10°–15°.

10. A method as claimed in claim 1 wherein the liquid is at least one of a liquid resin and a molten polymer.

11. A method as claimed in claim 2, wherein the separating channels each have a center line, and the center lines of the separating channels are arranged parallel to each other.

12. A method as claimed in claim 11 wherein the center-lines are spaced by a distance greater than the length of the filaments.

13. A method as claimed in claim 10, wherein the at least one or liquid resin and molten polymer has been produced by melting fiber containing granules which comprise a polymer or resin matrix surrounding at least a clump of filaments, the filaments being substantially parallel to each other.

14. A method as claimed in claim 2 wherein the arrays have entrances having distinct edges facing upstream.

15. A method as claimed in claim 13 wherein the at least one of liquid resin and molten polymer has been prepared from an admixture of said fiber containing granules and granules of a polymer or resin which do not contain filaments.

16. A method as claimed in claim 15 wherein the polymer matrix of the fiber containing granules is of a slightly higher melting point than that of the granules of polymer or resin which do not contain filaments.

17. A method as claimed in claim 1 wherein the filament separating channels have a minimum cross section area which is 1.5 to 3 times a cross sectional area of the clumps from which the filaments are to be separated.

18. A method as claimed in claim 1 wherein the separating channels in an array are laterally spaced by a distance which is small in comparison with the overall dimensions of the passageway along which the liquid is flowing.

19. A method as claim in claim 2 wherein the filament separating channels of at least one of the arrays are additionally adapted such that material entering the channels at a particular point in the cross-section of the flow passageway will emerge at a laterally separated point in the flow passageway cross-section thus providing transverse mixing.

20. A method as claimed in claim 2 wherein the successive and any subsequent arrays have filament separating channels which are greater in number but of reduced, cross-section in comparison to channels of an adjacent upstream array.

21. A method as claimed in claim 1 wherein the array has entrances has distinct edges facing upstream.

22. A method as claimed in claim 21 wherein the edges are disposed in a in rectangular or hexagonal array.

23. A method as claimed in claim 13 wherein the clumps in the fibre containing granules each contain 1000 to 5000 filaments.

* * * * *